United States Patent

Shimada

Patent Number: 5,963,711
Date of Patent: Oct. 5, 1999

[54] WATCH OUTER CASE POLISHING APPARATUS AND GENERAL PURPOSE POLISHING APPARATUS

[75] Inventor: Akira Shimada, Narashino, Japan

[73] Assignee: Seiko Seiki Kabushiki Kaisha, Japan

[21] Appl. No.: 08/727,357

[22] Filed: Oct. 8, 1996

[51] Int. Cl.$^6$ .................. B25J 13/08; B25J 9/16
[52] U.S. Cl. ................. 395/95; 395/86; 395/97; 318/568.11; 318/568.16; 318/568.19; 901/9; 901/41
[58] Field of Search .............. 318/568.11, 568.12, 318/568.16, 568.19, 568.2, 568.21, 568.22; 340/711; 51/3, 165.8; 395/95, 98, 86, 97; 901/3, 5, 7–9, 12, 13, 15–19, 21, 46; 364/169, 182

[56] References Cited

U.S. PATENT DOCUMENTS

| | | | |
|---|---|---|---|
| 4,731,607 | 3/1988 | Yoneda et al. | 345/112 |
| 4,753,044 | 6/1988 | Bula | 451/65 |
| 4,967,127 | 10/1990 | Ishiguro et al. | 318/571 |
| 5,129,044 | 7/1992 | Kashiwagi et al. | 395/86 |
| 5,130,632 | 7/1992 | Ezawa et al. | 318/568.11 |
| 5,241,792 | 9/1993 | Naka et al. | 451/24 |
| 5,315,222 | 5/1994 | Kasagami et al. | 318/568.11 |
| 5,668,453 | 9/1997 | Muto et al. | 318/568.17 |

FOREIGN PATENT DOCUMENTS

| | | | |
|---|---|---|---|
| 57-102794 | 6/1982 | Japan | B25J 19/00 |
| 6-15589 | 1/1994 | Japan | B25J 9/22 |
| 6-47688 | 2/1994 | Japan | B25J 9/22 |
| 6339848 | 12/1994 | Japan | B24B 19/08 |

Primary Examiner—Tariq R. Hafiz
Assistant Examiner—Jason W. Rhodes, Jr.
Attorney, Agent, or Firm—Adams & Wilks

[57] ABSTRACT

A polishing apparatus comprises a polishing member for polishing a workpiece and a manipulator for manipulating the workpiece and having a base disposed at a coordinate origin of a base coordinate system. The polishing member and workpiece define therebetween a contact surface having a contact surface coordinate system relative to an initial coordinate system defined when the polishing member and the workpiece initially contact one another at the contact surface but before a force is exerted on the contact surface to polish the workpiece. A first control device successively updates a position and attitude of the contact surface coordinator system with respect to the initial coordinate system on the basis of a deviation between preselected values of force and moment acting on the workpiece and detected values of force and moment acting at the contact surface between the polishing member and the workpiece when a force is exerted on the contact surface to polish the workpiece. A second control device successively updates a position and attitude of the contact surface coordinate system with respect to a coordinate system corresponding to the workpiece by changing a position and attitude of the workpiece. The calculating device calculates a position and attitude of the manipulator on the basis of the updated results of the first and second control devices and a position and attitude of the initial coordinate system with respect to the base coordinate system. The driving device drives the manipulator to manipulate the workpiece on the basis of the calculation results of the calculating device.

12 Claims, 15 Drawing Sheets

F I G. 2
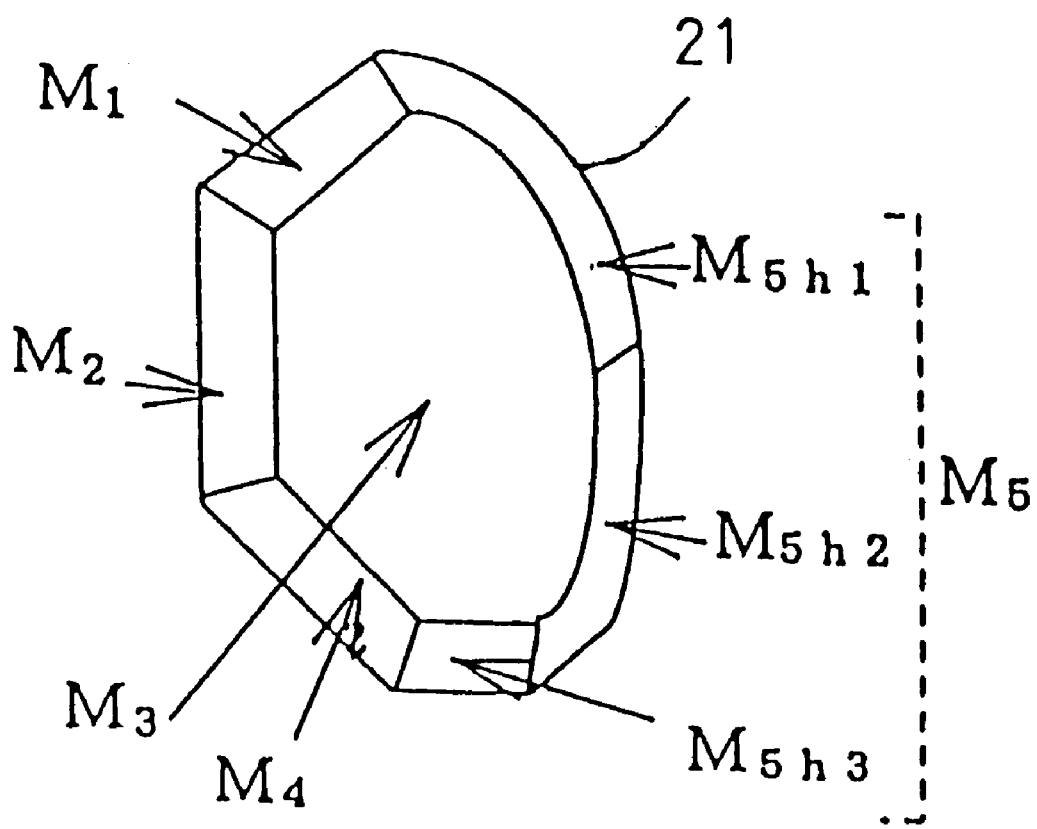

$$^cA_D = \begin{pmatrix} n_x & o_x & a_x & p_x \\ n_y & o_y & a_y & p_y \\ n_z & o_z & a_z & p_z \\ 0 & 0 & 0 & 1 \end{pmatrix}$$

$P = (p_x \ p_y \ p_z)$
$\vec{X}_D = (n_x, n_y, n_z)$
$\vec{Y}_D = (o_x, o_y, o_z)$
$\vec{Z}_D = (a_x, a_y, a_z)$ $$^DA_c = \begin{pmatrix} n_x & n_y & n_z & -n \cdot p_x \\ o_x & o_y & o_z & -o \cdot p_y \\ a_x & a_y & a_z & -a \cdot p_z \\ 0 & 0 & 0 & 1 \end{pmatrix}$$

F I G. 7
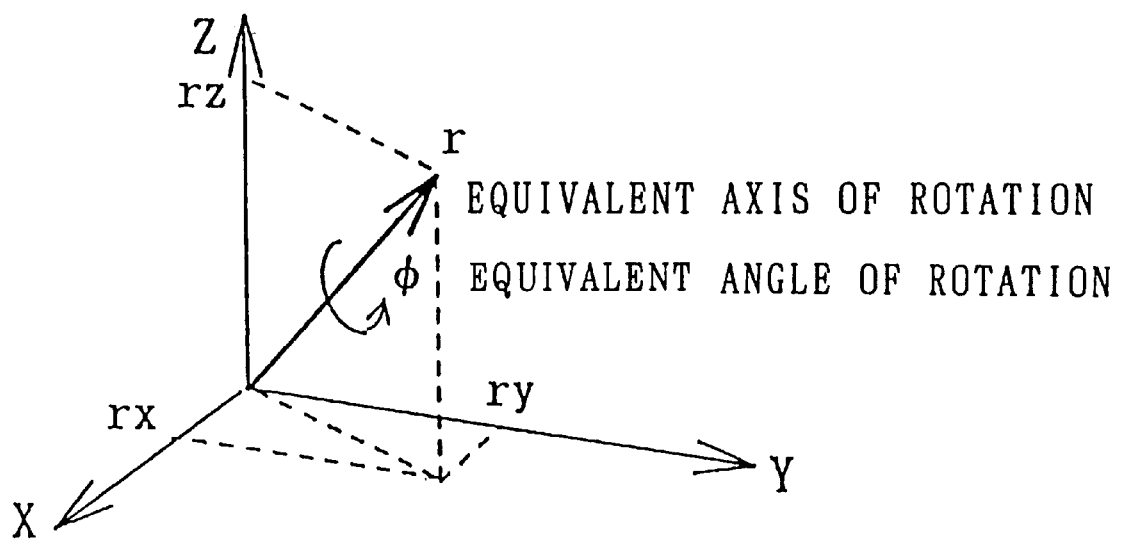

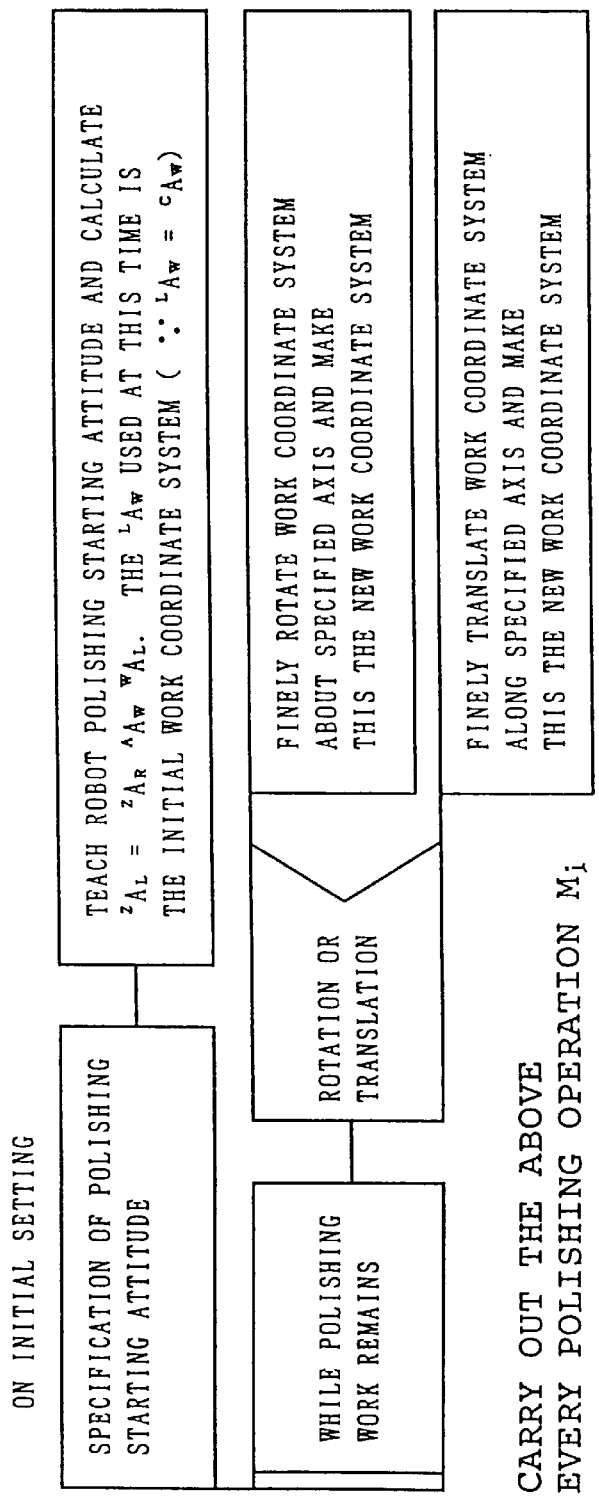
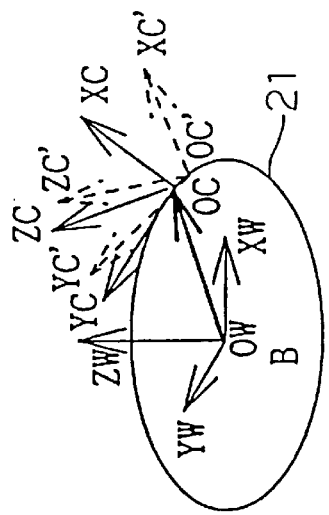
FIG. 8A
FIG. 8B

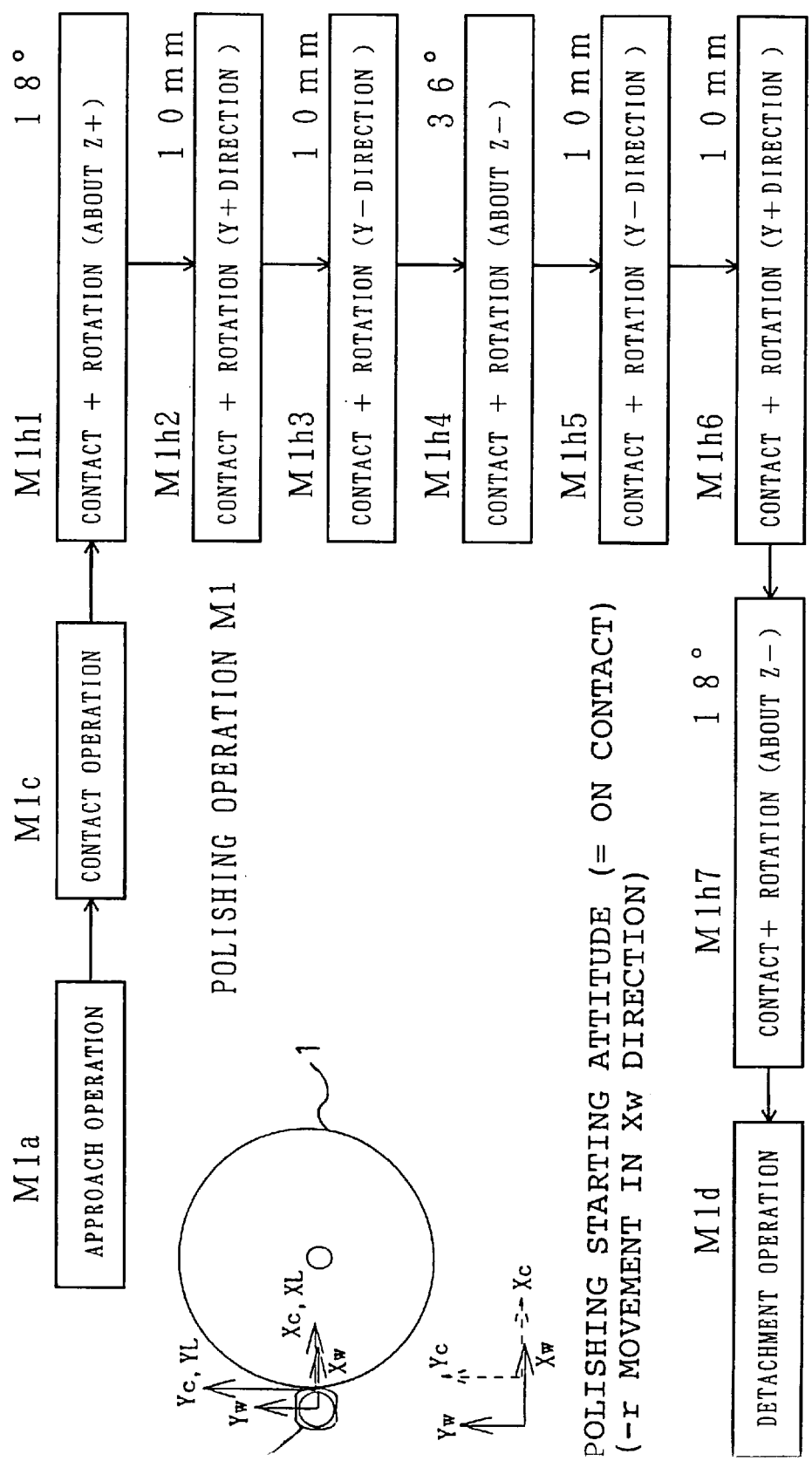

F I G. 1 0
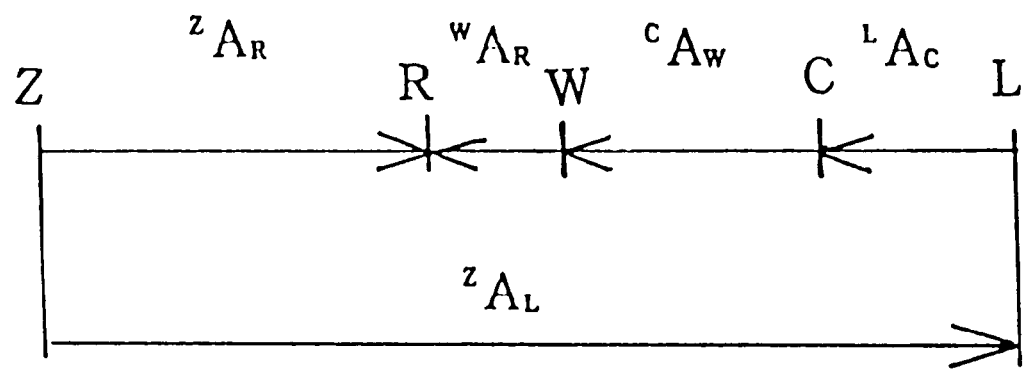

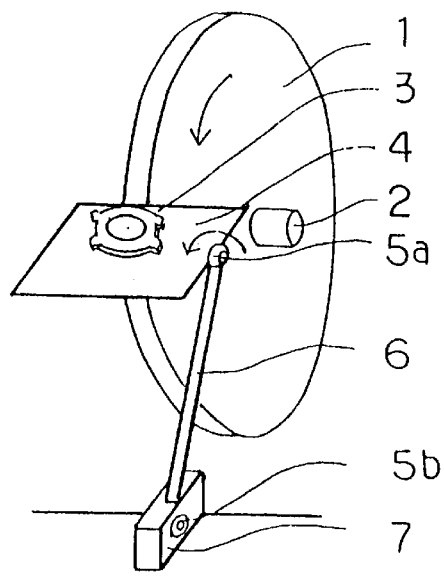
F I G. 1 5
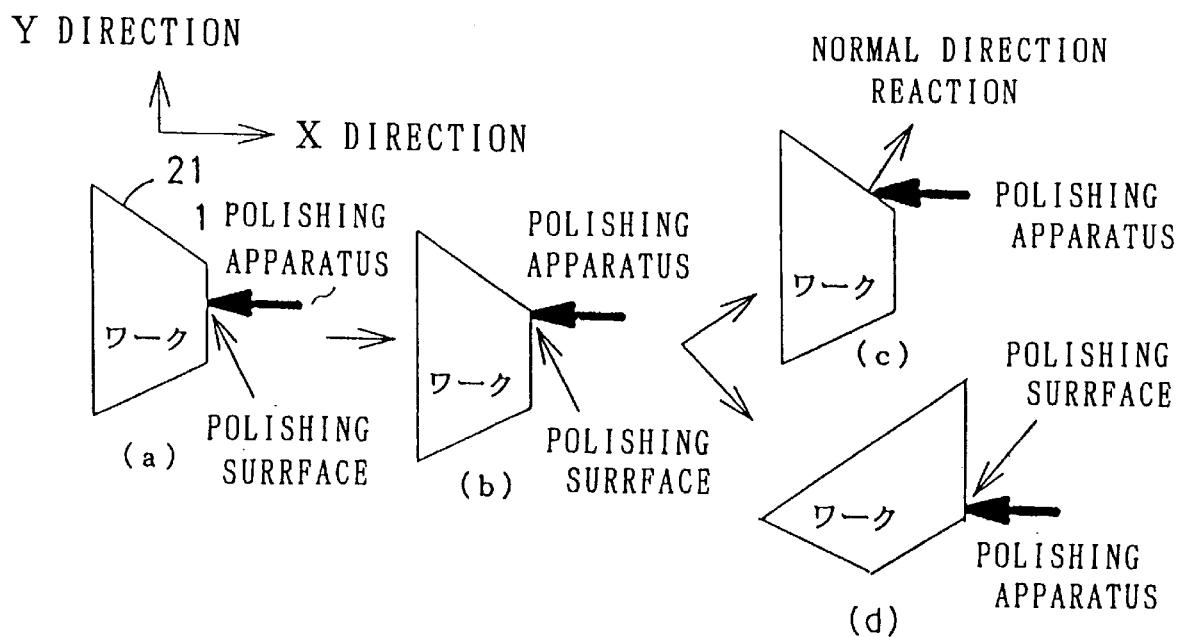
F I G. 1 6

WATCH OUTER CASE POLISHING APPARATUS AND GENERAL PURPOSE POLISHING APPARATUS

BACKGROUND OF THE INVENTION

This invention relates to a watch outer case polishing apparatus for automating a watch outer case polishing process by using a manipulator, and a watch outer case polishing apparatus and a general purpose polishing apparatus which arithmetically control the position and attitude of a workpiece and the force and moment exerted on a polishing wheel thereby in a functionally separated manner and simultaneously, and particularly to a watch outer case polishing apparatus and a general purpose polishing apparatus which can carry out stable control by attaining manipulator control equilibrium quickly and with which computation of position and other variables is simple and inexpensive.

Conventionally, the process of polishing a watch outer case has been carried out by hand by a skilled worker and has not been automated.

The polishing process can be roughly divided into coarse polishing, intermediate polishing and finishing polishing.

The construction of a coarse polishing apparatus conventionally used for polishing a watch outer case is shown in FIG. 15. In FIG. 15, the rotation shaft 2 of a polishing wheel 1 is supported in a predetermined spacial position. A plate 4 for a watch outer case 3 to be placed on is disposed with a small gap between it and the polishing wheel 1. The plate 4 is supported on a fixed base 7 by a plate arm 6 having screws 5a, 5b at its ends for changing the set position and attitude (angle) of the plate 4.

Using this arrangement, a worker carries out polishing in the following way:

The worker first places a watch outer case 3 on the plate 4. Then, with the underside of the watch outer case 3 in contact with the upper surface of the plate 4, the watch outer case 3 is slid toward the polishing wheel 1 and brought into contact with the polishing wheel 1. With the contact between the underside of the watch outer case 3 and the upper surface of the plate 4 still being maintained after the watch outer case 3 is brought into contact with the polishing wheel 1, the area of the watch outer case 3 making contact with the polishing wheel 1 is progressively changed as polishing is carried out. At this time, when polishing a watch outer case 3, it is necessary to polish the curved surfaces of the watch outer case 3 three-dimensionally. To do this, the worker adjusts the angle of the plate 4 to suit the surface being polished each time the surface being polished changes.

Because the operation must be performed by a skilled worker, the cost of a conventional, manual polishing operation has been high. Also, in recent years, the adoption of high-variety, low-quantity production has been progressing in the watch industry, and there has been the risk that even if a fixed sequence automatic polishing machine were to be developed it would not be flexible enough to cope with the demands of this kind of production.

Therefore, to solve the problems mentioned above, there has been a need to introduce a manipulator for realizing automation in the field of watch outer case polishing.

However, most manipulators which have been used for polishing in other fields hold the polishing wheel rather than the work and therefore are not suitable for introduction unchanged into the field of watch outer case polishing. Using such a manipulator for watch outer case polishing involves problems such as, since the polishing wheel is large and heavy, it is dynamically and controlwise, difficult to move. Because of this, also from the point of view of energy saving, the development of a manipulator which holds the watch outer case has been desired.

Also, even in the case of a manipulator which holds the work, with the kind of control which has conventionally been carried out there has been the following kind of problem: In FIGS. 16(a) to (d), a manipulator not shown in the drawings holds a piece of work 21. For example as shown in FIG. 16 (a), polishing is carried out by the work 21 being pressed against the polishing wheel 1 in the X direction with a force of 1 [N] while the work 21 is moved in the Y direction as shown in FIG. 16(b). FIG. 16(c) shows a case wherein the above-mentioned control is continued unchanged even when there is a change in the polishing surface, and FIG. 16(d) shows a case wherein when there is a change in the polishing surface the attitude of the work 21 is changed and then the above-mentioned control is continued. From the viewpoint that force and position are controlled simultaneously the above-mentioned control is called hybrid control, but the control is completely divided into force control in the X direction and position control in the Y direction. Because of this, movement in the X direction is determined on the basis of force information only, and when there is a change in the polishing surface of the work 21 the X component of a detected force value for example falls and the manipulator tries to compensate this result and tends to cause vibration by overextending.

Furthermore, because hybrid control involves complicated matrix calculations, it is necessary to devise a mechanical construction suited to matrix calculation with which for example outside force estimation is easy.

Also, there is a need to be able to use a single manipulator with a plurality of polishing wheels 1 such as one for normal use and a spare or ones having different polishing grades.

Furthermore, to detect reaction forces at joint parts of the manipulator, force sensors and torque sensors or the like are provided for example in a wrist part of the manipulator, and there has been the problem that the proportion of the overall cost of the manipulator expended on such sensors is high.

SUMMARY OF THE INVENTION

This invention was made in view of the kinds of problem described above, and an object of the invention is to automate the process of polishing a watch outer case by developing a watch outer case polishing apparatus using a manipulator. More specifically, it is an object of the invention to provide a cheap and highly flexible watch outer case polishing apparatus and general purpose polishing apparatus which achieves control equilibrium quickly by conducting arithmetic control of the position and attitude of the work and the pressing force and moment exerted on the polishing wheel by the work in a functionally separated manner and simultaneously.

To achieve this, the invention provides a watch outer case polishing apparatus comprising a spacial position coordinates moving device with a coordinates origin as a reference for determining spatial position coordinates of an arm base point located at the center of a rotation joint, an arm structure consisting of at least one combination of a rotation joint and a link and having one end at the arm base point, a holding mechanism having one end fixed to the other end of the arm structure and the other end holding a watch outer case, and a polishing wheel for polishing a surface of the watch outer case by pressing against the surface and having a center shaft for rotary power transmission supported in a predetermined spacial coordinate position.

The invention also provides a general purpose polishing apparatus comprising a first translation joint device having one end fixed at a coordinates origin and linearly driving a first joint at the other end, a second translation joint device having one end supported by the first joint and linearly driving a second joint at the other end, an arm base point translation device having one end supported by the second joint and linearly driving a rotation joint having an arm base point at its center, an arm structure consisting of at least one combination of a rotation joint and a link and having one end at the arm base point, a holding mechanism having one end fixed to the other end of the arm structure and the other end holding a piece of work, and a polishing wheel for polishing a surface of the work by pressing against the surface and having a center shaft for rotary power transmission supported in a predetermined spacial coordinate position, wherein the linear drive direction of the first translation joint device, the linear drive direction of the second translation joint device and the linear drive direction of the arm base point translating device are severally parallel to an X axis, a Y axis and a Z axis having the coordinates origin as a reference and also corresponding axes of an initial coordinate system set when the polishing wheel and the work first make contact without pressing and the X axis, Y axis and Z axis having the coordinates origin as a reference are parallel.

Also, the invention provides a general purpose polishing apparatus wherein a plurality of polishing wheels are arranged radially with respect to a coordinates origin, the general purpose polishing apparatus comprising a turning device turnable in a circumferential direction about a vertical axis with respect to a plane to which the coordinates origin belongs, a first joint fixed to a top part of the turning device, a second translation joint device having one end supported by the first joint and linearly driving a second joint at the other end in a direction perpendicular to the vertical axis, a third translation joint device having one end supported by the second joint and linearly driving a first rotation joint at the other end in a direction parallel to the vertical axis, an arm structure consisting of at least one combination of a rotation joint and a link from the third translation joint device, a holding mechanism having one end fixed to the other end of the arm structure and the other end holding a piece of work, and a plurality of polishing wheels each for polishing a surface of the work by pressing against the surface and having a center shaft for rotary power transmission supported in a predetermined spacial coordinate position, wherein two axes of an initial coordinate system set when a polishing wheel and the work first make contact without pressing and the linear drive direction of the second translation joint device and the linear drive direction of the third translation joint device are parallel.

Further, the invention provides a general purpose polishing apparatus for carrying out polishing by simultaneously controlling the position and attitude of a polishing wheel or a piece of work polished by being pressed against a polishing wheel and a force and a moment acting between the polishing wheel and the work and holding the polishing wheel or the work using a manipulator having its base at a coordinates origin, the general purpose polishing apparatus comprising a force control law device for on the basis of deviation between command set values of force and moment to act between the polishing wheel and the work preset for each polishing process and detected values of force and moment obtained by detecting reaction values of force and moment acting at a contact surface pressed between the polishing wheel and the work successively updating the position and attitude of a contact surface coordinate system belonging to the contact surface belongs with respect to an initial coordinate system set when the polishing wheel and the work first make contact without pressing, a position and attitude controlling device for successively updating the position and attitude of the contact surface coordinate system with respect to a coordinate system belonging to the polishing wheel or the work by changing the position and attitude of the polishing wheel or the work, a manipulator fingertip computing device for computing a fingertip position and attitude of the manipulator on the basis of calculation results of the position and attitude controlling device and the force control law device and the position and attitude of the initial coordinate system with respect to a base coordinate system to which the coordinates origin belongs, and a joint driving device for driving respective driving parts of a translation joint or a rotation joint constituting the manipulator on the basis of calculation results of the manipulator fingertip computing device.

Also, in the invention, the detected values of force and moment are estimated by an observer from driving forces of the driving parts driven by the joint driving device and displacements resulting from the application of the driving forces.

BRIEF DESCRIPTION OF THE DRAWINGS

FIG. 2 shows an example of the shape of a piece of work having multiple polishing faces.

FIG. 7 is a schematic view of an equivalent axis of rotation and an equivalent angle of rotation;

FIG. 8 is a schematic view showing the relationship between a work coordinate system and a contact surface coordinate system;

FIG. 9 shows an example of attitude control in polishing a side surface of a watch outer case;

FIG. 10 is a vector diagram showing a relationship between simultaneous conversion matrices;

FIG. 15 is a view of the construction of a conventional apparatus for coarse polishing of a watch outer case; and FIG. 16 is a schematic view of conventional hybrid control.

DETAILED DESCRIPTION OF THE PREFERRED EMBODIMENTS

Preferred embodiments of the invention will now be described with reference to the accompanying drawings.

Figure 1:
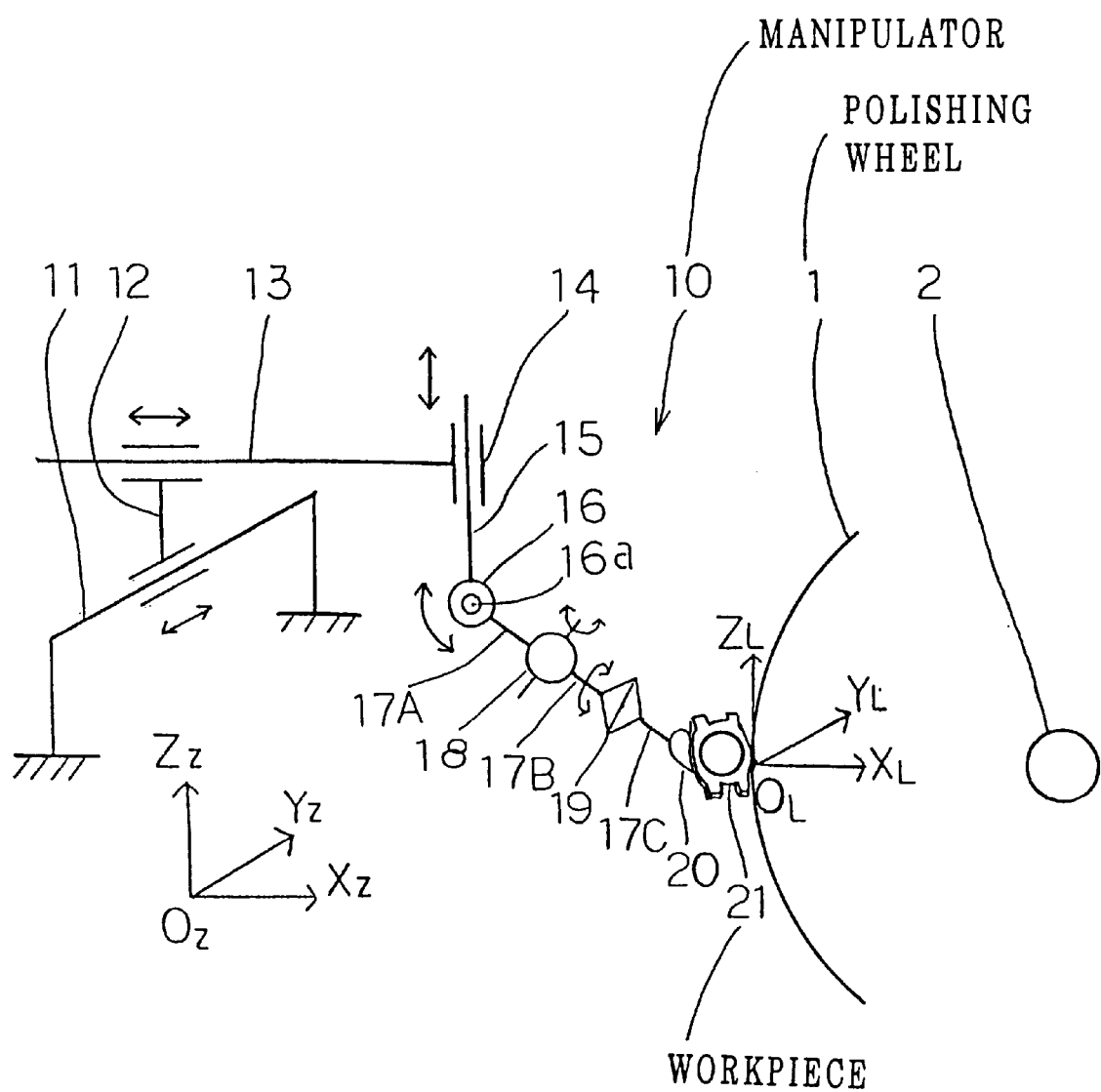
FIG. 1 is a view of the construction of a watch outer case polishing apparatus of a first preferred embodiment of the invention.

In FIG. 1, which shows a manipulator 10 of a first preferred embodiment of the invention, a first translation joint 11 linearly drives a first joint 12 from a coordinates origin $O_Z$ in the $Y_Z$ direction and is equivalent to a first translation joint device. A second translation joint 13 has one end supported by the first joint 12 and linearly drives a second joint 14 at its other end in the $X_Z$ direction, and is equivalent to a second translation joint device. A third translation joint 15 has one end supported by the second joint 14 and linearly drives a first rotation joint 16 at its other end in the $Z_Z$ direction, and is equivalent to an arm base point translating device. The combination of the first translation joint 11, the second translation joint 13 and the third translation joint 15 are moving elements defining to a spacial position coordinates moving device. One end of a first link 17A is fixed to an arm base point 16a of the first rotation joint 16, and one end of a second link 17B is fixed to the other end of the first link 17A by way of a second rotation joint 18. One end of a third link 17C is fixed to the other end of the second link 17B by way of a third rotation joint 19. The combination of the first rotation joint 16, the first link 17A, the second rotation joint 18, the second link 17B, the third rotation joint 19 and the third link 17C is equivalent to an arm structure. The other end of the third link 17C is equivalent to the fingertip of the manipulator 10, and has fixed thereto a wrist mechanism 20 constituting a holding mechanism for holding a piece of work 21. The first rotation joint 16, the second rotation joint 18 and the third rotation joint 19 are respectively rotatable as shown by the arrows in the drawing. A polishing wheel 1, the rotation shaft 2 of which is supported in a predetermined spatial position, is disposed facing the work 21.

Because if as described above the manipulator 10 has six joints it can execute the same movements as a person, ideally it has six joints. However, it does not necessarily have to have six joints and can be constructed with joints and links dispensed with according to pertaining requirements.

The first translation joint 11, the second translation joint 13 and the third translation joint 15 are for example made up of cylinders and pistons, and can be driven for example electrically, hydraulically or pneumatically. $X_Z$, $Y_Z$ and $Z_Z$ are rectangular coordinate axes but the axes can be set to any directions. If convenience of calculation discussed hereinafter is considered, it is necessary to make the first translation joint 11, the second translation joint 13 and the third translation joint 15 of the spacial position coordinates moving means parallel with corresponding axes $X_Z$, $Y_Z$ and $Z_Z$. However, if convenience of calculation is not considered, the spacial position coordinates moving device may be constructed with rotation joints and the number of translation joints also need not be limited to three corresponding to coordinate axes as described above. Nor need they necessarily be made parallel with rectangular coordinate axes. Also, the spacial position coordinates moving device may be constructed using a combination of rotation joints and translation joints.

Next, control of the manipulator 10 will be described.

Figure 3:
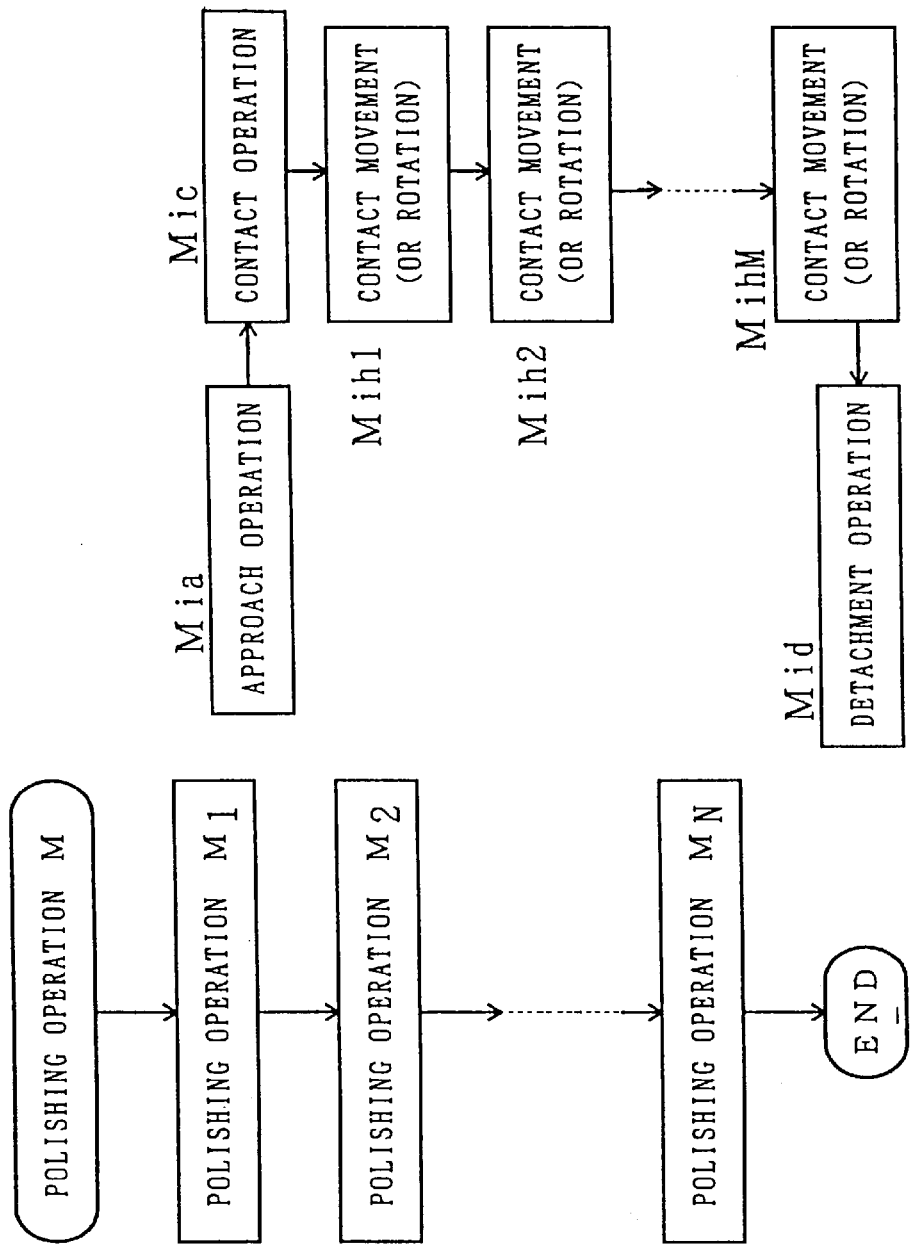
FIG. 3 shows the flow of an operation of polishing multiple faces of a piece of work.

The manipulator 10 performs polishing on a piece of work 21 of for example the kind of shape shown in FIG. 2. N different polishing operations $M=(M_1, M_2, \ldots, M_i, \ldots, M_N)$ are defined with respect to N polishing surfaces of the work 21. The polishing flow of each polishing operation $M_i$ is shown in FIG. 3. The manipulator 10 performs polishing of the work 21 in polishing operations $M_1, M_2, \ldots$, sequentially. In each polishing operation $M_i$, the manipulator 10 first performs approach and contact of the work 21 to the polishing surface. Here, in the case of a single polishing operation wherein a series of polishings are carried out consecutively, approach and contact are performed in $M_i$ and subsequent polishing operations are performed continuously without detachment of the work 21 from the polishing wheel. With a pressing force accompanying contact with each polishing surface, the polishing operations are carried out by suitably moving the polishing surface or rotating the work 21. After the series of polishing operations is completed, the manipulator 10 performs an operation of detaching the work 21 from the polishing surface.

Figure 4:
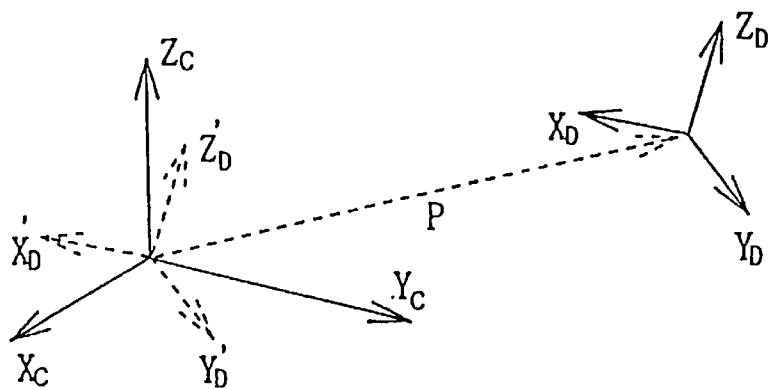
FIG. 4 shows a simultaneous conversion matrix for converting between any two coordinate systems.

The manipulator 10 determines a predetermined position and attitude in space, and generally to realize any position and attitude in three-dimensional space six degrees of freedom are necessary: three degrees of freedom of position and three degrees of freedom of attitude. Accordingly, to define this position and attitude, any two coordinate systems are selected and one of the coordinate systems as seen from the other coordinate system is expressed with a 4×4 matrix (hereinafter called a simultaneous conversion matrix), as shown in FIG. 4. In FIG. 4, $^CA_D$ shows the position and attitude of a coordinate system D with respect to a coordinate system C. $p_X$, $p_Y$, $p_Z$ are the value of a position vector P of the origin of the coordinate system D as seen from the origin of the coordinate system C. $n_X$, $n_Y$, $n_Z$, $o_X$, $o_Y$, $o_Z$ and $a_X$, $a_Y$, $a_Z$ are coordinate components of a point at magnitude 1 on each of the axes of the coordinate system D when the origin of the coordinate system D is supposed to have been moved to the origin of the coordinate system C. Here, $n_X$, $n_Y$, $n_Z$, etc., show the attitude of the coordinate system D with respect to the coordinate system C. On the other hand, in FIG. 4, $^DA_C$ is the position and attitude of the coordinate system C with respect to the coordinate system D shown with a simultaneous conversion matrix.

Using this kind of simultaneous conversion matrix to express positions and attitudes for the manipulator 10 holding the work 21 and the polishing wheel 1 as a whole is convenient from the calculation point of view because it makes it possible to replace position and attitude calculations with matrix calculations.

Figure 5:
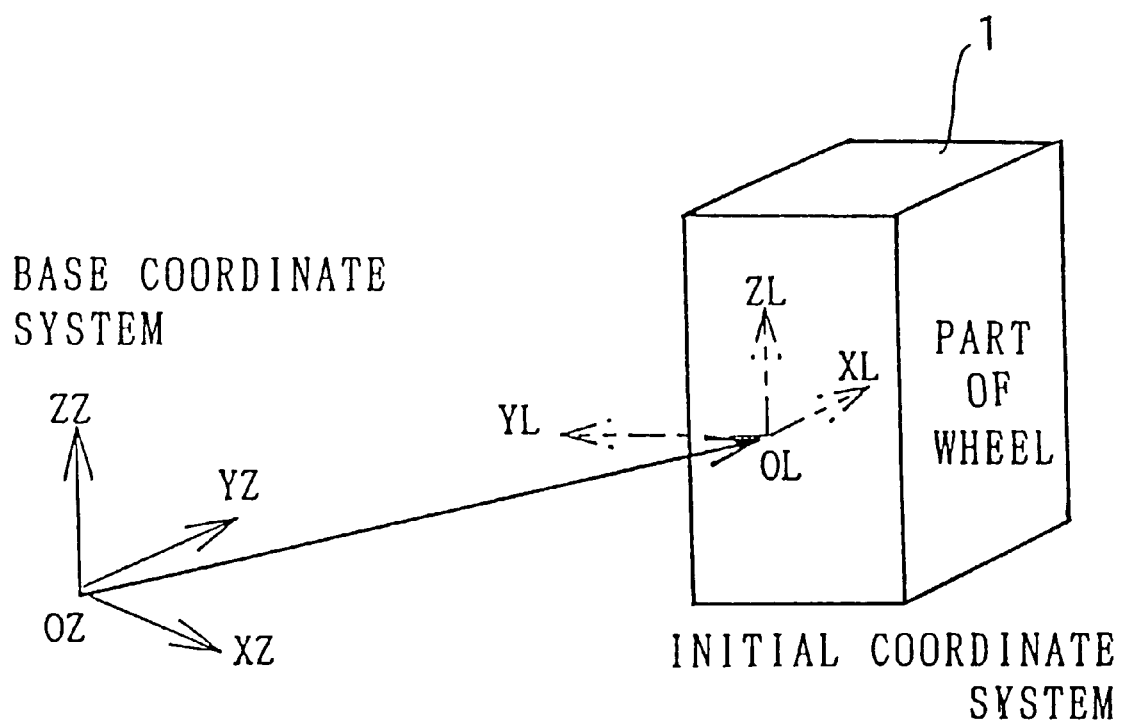
FIG. 5 is a schematic view of a base coordinate system and an initial coordinate system.

Now, a coordinate system including a coordinates origin $O_Z$ will be defined as a base coordinate system Z. Also, a polishing starting attitude is set for each of the above-mentioned polishing operations $M_i$, and a coordinate system fixed on the wheel 1 side in the position and attitude in which the polishing surface of the work 21 and the polishing wheel 1 start to make contact will be defined as the initial coordinate system L. The base coordinate system Z and the initial coordinate system L are shown in FIG. 5. The initial coordinate system L is set with respect to the base coordinate system Z according to the polishing starting attitude for each surface of the work 21 to be polished. The initial coordinate system L with respect to the base coordinate system Z is expressed using a simultaneous conversion matrix as $^ZA_L$.

Figure 6:
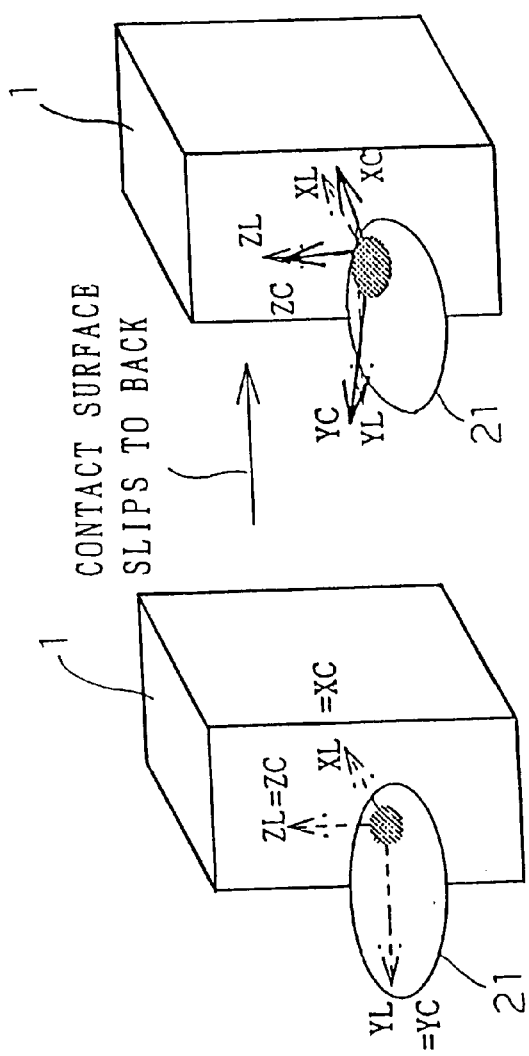
FIG. 6(A) and FIG. 6(B) are schematic views of an initial coordinate system and a contact surface coordinate system.

Next, between a polishing wheel 1 using for example a buff lace and the work 21, a contact surface coordinate system C fixed to the work 21 side will be defined. When the work 21 is in contact with the polishing wheel 1 at the start of a polishing operation, as long as the work 21 does not exert a force on the polishing wheel 1, the initial coordinate system L and the contact surface coordinate system C coincide. The state at this time is shown in FIG. 6(A).

When the work 21 exerts a certain force and moment on the polishing wheel 1, the polishing wheel 1 deforms elastically. When it is supposed that the polishing wheel 1 has yielded in the XL direction, the contact surface coordinate system C of the work 21 displaces from the initial coordinate system L. The state at this time is shown in FIG. 6(B). This displacement in position and attitude can be thought of as a function of a force and a moment arising between the two. Here, on the basis of information on the force and moment exerted by way of the work 21 on the contact surface between the work 21 and the polishing wheel 1, control successively updating the contact surface coordinate system C of the work 21 with respect to the initial coordinate system L is possible. That is, force control can be realized by successively updating the contact surface coordinate system C on the basis of values of deviation between command set values of force and moment and detected values of force and moment obtained by detecting reaction values of force and moment acting at the contact surface pressed between the polishing wheel 1 and the work 21. Here, the command set values of force and moment will be written:

$$F_r = [F_{Xr}, F_{Yr}, F_{Zr}, M_{Xr}, M_{Yr}, M_{Zr}]^T \quad \text{(Exp. 1)}$$

and the detected values of force and moment will be written:

$$F = [F_X, F_Y, F_Z, M_X, M_Y, M_Z]^T \quad \text{(Exp. 2)}$$

The difference between the two will be called the force and moment error vector $E_F$:

$$E_F = F_r - F = [E_{FX}, E_{FY}, E_{FZ}, E_{MX}, E_{MY}, E_{MZ}]^T \quad \text{(Exp. 3)}$$

A position and attitude error vector dX corrected by $E_F$ will be written as follows:

$$dx = [d_{FX}, d_{FY}, d_{FZ}, d_{MX}, d_{MY}, d_{MZ}]^T \quad \text{(Exp. 4)}$$

A method of combining the two is shown below:
With respect to force control, $$[d_{FX}, d_{FY}, d_{FZ}]^T = \text{diag}[K_X, K_Y, K_Z][E_{FX}, E_{FY}, E_{FZ}]^T \quad \text{(Exp. 5)}$$

where:

$$K_x = K_{px} + K_{ix} \cdot \int dt + K_{dx} \cdot d/dt$$
$$K_y = K_{py} + K_{iy} \cdot \int dt + K_{dy} \cdot d/dt$$
$$K_z = K_{pz} + K_{iz} \cdot \int dt + K_{dz} \cdot d/dt \quad \text{(Exp. 6)}$$

With respect to moment control, the attitude error $E_O$ is:

$$E_O = [d_{MX}, d_{MY}, d_{MZ}]^T = [r_x, r_y, r_z]^T \cdot \sin\phi, \quad \text{(Exp. 7)}$$

where r is an equivalent axis of rotation vector and $\phi$ ($0 \leq \phi \leq \pi/2$) is an equivalent angle of rotation.

FIG. 7 illustrates equivalent axis of rotation and equivalent angle of rotation. The equivalent axis of rotation and equivalent angle of rotation are introduced in Exp. 7 because when roll, pitch and yaw angles or Euler angles and attitude error are combined it is necessary to consider the rotation order. Because the detection order by axis is not included in the detected moment values, it is not natural to combine the control law with their attitude expressions directly. This method wherein force and moment information are combined with an equivalent axis of rotation and an equivalent angle of rotation is approximate, but is free from that kind of inconsistency. As another way of dealing with this, there is the method of also expressing moment as generalized forces corresponding to roll, pitch and yaw angles or Euler angles (see Nakamura Hitohiko, Lecture Notes Chapters 2 through 6).

At this time, the moment control law is made:

$$E_O = \text{diag}[K_{mX}, K_{mY}, K_{mZ}][E_{MX}, E_{MY}, E_{MZ}]^T \quad \text{(Exp. 8)}$$

where:

$$K_{mX} = K_{mpx} + K_{mix} \cdot \int dt + K_{mdx} \cdot d/dt \quad \text{(Exp. 9)}$$
$$K_{my} = K_{mpy} + K_{miy} \cdot \int dt + K_{mdy} \cdot d/dt$$
$$K_{mz} = K_{mpz} + K_{miz} \cdot \int dt + K_{mdz} \cdot d/dt$$

The gains are set so that Exp. 11 holds. The example given above is a PID control system, but where necessary the use of other algorithms can be considered (J. C. Doyle, "State-Space Solution to H2 and H∞ Control Problems", IEEE Transactions on Automatic Control, Vol. 34, No. 8, pp. 831–847, 1989, S. Boyd "Linear Matrix Inequalities in System and Control Theory", Siam, 1994).

On the basis of the results of Exp. 7, Exp. 8 and Exp. 9, r and $\phi$ are found from Exp. 10 and Exp. 11 and a corresponding coordinates conversion matrix Exp. 12 is obtained. In Exp. 12, C stands for cos, S for sin and V for 1-cos.

$$|dM| = (dM_x^2 + dM_y^2 + dM_z^2)^{1/2}, \quad \text{(Exp. 10)}$$

where $$|dM| \leq 1.$$

When Exp. 11 is not satisfied, dMX, dMY, dMZ are divided by $$|dM|.$$

$$r_x = dM_x/|dM|, \; r_y = dM_y/|dM|, \; r_z = dM_z/|dM| \quad \text{(Exp. 11)}$$
$$\sin\phi = |dM|, \phi = \sin^{-1}|dM| \quad (0 \leq \phi \leq \pi/2)$$

From the above, $$^L A_c = \begin{bmatrix} r_x \cdot r_x \cdot V\phi + C\phi & r_x \cdot r_y \cdot V\phi - r_z \cdot S\phi & r_x \cdot r_z \cdot V\phi + r_y \cdot S\phi & d_{FX} \\ r_x \cdot r_y \cdot V\phi + r_z \cdot S\phi & r_y \cdot r_y \cdot V\phi + C\phi & r_y \cdot r_z \cdot V\phi - r_x \cdot S\phi & d_{FY} \\ r_x \cdot r_z \cdot V\phi - r_y \cdot S\phi & r_y \cdot r_z \cdot V\phi + r_x \cdot S\phi & r_z \cdot r_z \cdot V\phi + C\phi & d_{FZ} \\ 0 & 0 & 0 & 1 \end{bmatrix} \quad \text{(Exp. 12)}$$

Exp. 12 is a simultaneous conversion matrix including inside it a force compensator. Control successively updating the simultaneous conversion matrix $^L A_C$ of the contact surface coordinate system C with respect to the initial coordinate system L on the basis of the force control and moment control law described above is equivalent to first control device, hereinafter referred to as a force control law device.

Next, assuming that the shape of the work 21 and the contact point (surface) on the work 21 are known and can be taught by moving the contact point (surface) in advance to the contact point of the polishing wheel 1, it is possible to set the attitude and initial coordinate system L at which polishing starts. A contact surface coordinate system C for performing force control is set for each initial coordinate system L as described above, and on the other hand a work coordinate system W with respect to the contact surface coordinate system C is defined with $^CA_W$. The work coordinate system W is set imaginarily for example in the center of the work 21. Here, control changing the position and attitude of the contact point by changing the work coordinate system W is possible.

The relationship between the work coordinate system W and the contact surface coordinate system C is shown in FIG. 8(A). Movement or rotation of the contact surface is brought about by rotation or translation of the work coordinate system W with respect to the contact surface coordinate system C, and the contact surface coordinate system C moves or rotates as a result. The polishing starting attitude is taught to the manipulator 10 in advance as shown in FIG. 8(B). At this time, the initial coordinate system L and the contact surface coordinate system C are equal. The polishing starting attitude is taken into the calculation expressions as a simultaneous conversion matrix.

Next, a coordinate system belonging to the fingertip of the manipulator 10 will be defined as the manipulator fingertip coordinate system R. The simultaneous conversion matrix $^WA_R$ of the manipulator fingertip coordinate system R with respect to the work coordinate system W is always a constant, for example as shown in Exp. 13. However, the numerical values differ according to the mechanism.

$$^WA_R = \begin{bmatrix} 1 & 0 & 0 & -60 \\ 0 & 1 & 0 & 0 \\ 0 & 0 & 1 & 79 \\ 0 & 0 & 0 & 1 \end{bmatrix} \quad \text{(Exp. 13)}$$

A polishing operation $M_i$ is carried out by performing rotation or translation. For rotation, the work coordinate system W is finely rotated about a specified axis and made the new work coordinate system W. For translation, the work coordinate system W is finely translated along a specified axis and made the new work coordinate system W. This operation is carried out for every polishing operation $M_i$.

FIG. 9 shows a specific attitude control example supposing side surface polishing of a watch outer case 3 as the work 21. That is, from a state wherein the watch outer case 3 has been made vertical and brought into contact with a polishing wheel 1, a curved side surface is polished. The manipulator 10, holding the watch outer case 3, approaches the polishing wheel 1 ($M_{1a}$), and brings the watch outer case 3 into contact with the polishing wheel 1 ($M_{1c}$). At this time the distance between the work coordinate system W and the contact surface coordinate system C is, in the case of a circular case, the case radius r. Then, first, to polish the upper right side surface of the watch outer case, while still in contact with the polishing wheel 1 the case is rotated through +18° about the $Z_W$ axis ($M_{1h1}$). After that, it is moved 10 mm in the $Y_W$ axis direction ($M_{1h2}$), and returned ($M_{1h3}$). Then, to polish the lower right side surface, while still in contact with the wheel 1 it is rotated through −36° about the $Z_W$ axis ($M_{1h4}$). As with the upper right side surface it is then moved 10 mm in the $Y_W$ axis minus direction ($M_{1h5}$), and returned 10 mm ($M_{1h6}$). After that, while still in contact with the polishing wheel 1, it is rotated through +18° about the $Z_W$ axis to return it to its original state at the time of initial contact ($M_{1h7}$), and detached ($M_{1d}$). The simultaneous conversion matrices ($M_{1hj}$(j=1–7)) in this contact state are expressed as shown in Exp. 14. The set conditions of the polishing process described above are shown in Table 1.

$$^{1c}A_{1h}(j = 1-7) = \begin{bmatrix} \cos\alpha & -\sin\alpha & 0 & -r \\ \sin\alpha & \cos\alpha & 0 & y1 \\ 0 & 0 & 1 & 0 \\ 0 & 0 & 0 & 1 \end{bmatrix} \quad \text{(Exp. 14)}$$

$$y10 \geq y1 \geq -y10$$

TABLE 1

| j | r (mm) | α(deg)    | yl (mm)   |
|---|--------|-----------|-----------|
| 1 | 12     | 0 to 18   | 0         |
| 2 | 12     | 18        | 0 to 10   |
| 3 | 12     | 18        | 10 to 0   |
| 4 | 12     | 18 to −18 | 0         |
| 5 | 12     | −18       | 0 to −10  |
| 6 | 12     | −18       | −10 to 0  |
| 7 | 12     | −18 to 0  | 0         |

The above-described control successively updating the position and attitude of the contact surface coordinate system C with respect to the work coordinate system W is equivalent to a second control device, hereinafter referred to as a position and attitude controlling device.

Because simultaneous conversion matrices are created in this way with control successively updating the simultaneous conversion matrix $^LA_C$ of the contact surface coordinate system C with respect to the initial coordinate system L on the basis of force control and moment control law and control successively updating the position and attitude of the contact surface coordinate system C with respect to the work coordinate system W functionally separated, it is possible to arithmetically control position, attitude, force and moment simultaneously and furthermore control in an ordered form is possible. As a result, vibration caused by overextending of the manipulator or the like which has existed in the past does not readily occur, and it is possible to attain control equilibrium quickly. Also, force is not always applied from one direction as in the past, and control which achieves a balance of force and moment suited to the contact surface of each polishing operation becomes possible.

With respect to the manipulator 10, on the basis of the simultaneous conversion matrices calculated as described above, a coordinate conversion equation of the kind shown in Exp. 15 can be constructed.

$$^ZA_R = {}^ZA_L {}^LA_C {}^CA_W {}^WA_R \quad \text{(Exp. 15)}$$

To facilitate understanding, the relationship between these simultaneous conversion matrices is shown with a vector diagram in FIG. 10. Here, the simultaneous conversion matrix $^ZA_L$ of the initial coordinate system L with respect to the base coordinate system Z and the simultaneous conversion matrix $^WA_R$ of the manipulator fingertip coordinate system R with respect to the work coordinate system W are constants determined by the mechanism. Therefore, if the simultaneous conversion matrix $^LA_C$ of the contact surface coordinate system C with respect to the initial coordinate system L successively updated on the basis of the force control and moment control law and the simultaneous conversion matrix $^{C}A_{W}$ successively updating the position and attitude of the work coordinate system W with respect to the contact surface coordinate system C are calculated, it is possible to find the simultaneous conversion matrix $^{Z}A_{R}$ of the manipulator fingertip coordinate system R with respect to the base coordinate system Z and as a result it is possible to obtain the position and attitude of the fingertip of the manipulator 10. This computation obtaining the position and attitude of the fingertip of the manipulator 10 is equivalent to a calculating devive, hereinafter referred to as a manipulator fingertip computing devive.

Figure 11:
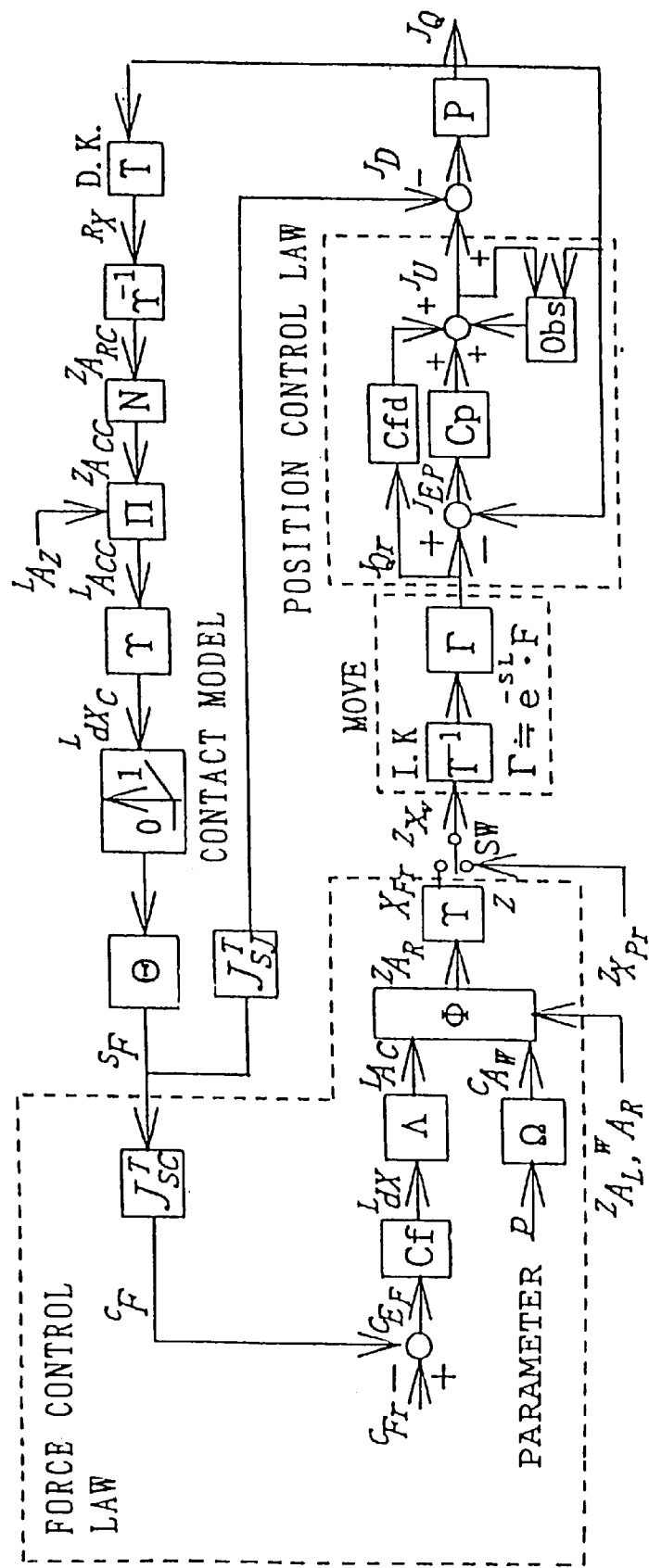
FIG. 11 is a control block diagram of the watch outer case polishing apparatus of the first preferred embodiment of the invention.

On the basis of the description given thus far, a block diagram of this control for controlling force and moment in any attitude is shown in FIG. 11. The control will now be described on the basis of the block diagram of FIG. 11. The difference between command set values of force and moment $^{C}F_{r}$ expressed in the contact surface coordinate system C and detected values of force and moment $^{C}F$ expressed in the contact surface coordinate system C is taken to obtain a force and moment error vector $^{C}E_{F}$. Then, on the basis of the force and moment error vector $^{C}E_{F}$, a position and attitude error vector $^{L}dX$, which is a displacement of the contact surface coordinate system C from the initial coordinate system L, is calculated by a force compensator Cf. In Λ, position and attitude data expressed with equivalent axis of rotation and equivalent angle of rotation are converted into simultaneous conversion matrix form. In Ω, the simultaneous conversion matrix $^{C}A_{W}$ converting from the contact surface coordinate system C to the work coordinate system W is calculated on the basis of the operation parameters r, α, yl shown in Table 1. In Φ, the simultaneous conversion matrix $^{Z}A_{R}$ of the manipulator fingertip coordinate system R with respect to the base coordinate system Z corresponding to the results outputted by the force compensator Cf and the working parameters is obtained. Next, in Y, conversion from the simultaneous conversion matrix $^{Z}A_{R}$ to position and roll, pitch and yaw angles is carried out. Here, $X_{Fr}$ is a reference value of a target to which the manipulator 10 is to move. $^{Z}X_{Pr}$ is a position target to which the manipulator 10 is to be moved when force control is not carried out. $T^{-1}$ is an inverse kinematic equation, and converts variables expressed with a rectangular coordinate system into a polar coordinate system. Γ represents a calculation delay in calculating this conversion to a polar coordinate system with a calculator. $^{J}Q_{r}$ shows movement target values of joint axes. Here, the prefix J indicates that the values are in a joint axis coordinate system. $C_{fd}$ is a position control feed forward compensator. $^{J}E_{P}$ is the deviation between the movement target values $^{J}Q_{r}$ of the joint axes and the actual angles $^{J}Q$ of the joint axes. A position control compensator $C_{P}$ outputs driving torques of the joint axes and is equivalent to joint driving means. $O_{bs}$ is a disturbance/speed observer and feedback compensator; it inputs the driving torques applied to the joint axes and the actual displacements (angles) $^{J}Q$ of the joint axes and estimates disturbance using observer theory and feeds it back to the control system. Because torque sensors and the like are expensive, $O_{bs}$ is used as a substitute. The driving torques are converted into currents before being read in. A method for realizing an observer with a calculator is described in detail in article: 'Digitalization of Control System using Disturbance Torque/Speed Estimation Observer', 'Dengakuron' Vol. 113 No. 4, 1993.

Control object model P represents an m input, 1 output transmission coefficient, and its output is the actual angles $^{J}Q$ of the joint axes. The angles $^{J}Q$ are converted from polar coordinates into rectangular coordinates in T. T is a forward kinematic equation, and the three components of attitude are expressed as roll, pitch and yaw angles. In $Y^{-1}$, conversion from these roll, pitch and yaw angles into a simultaneous conversion matrix $^{Z}A_{RC}$ is carried out. In N, a simultaneous conversion matrix converting from the manipulator fingertip coordinate system R to the contact surface coordinate system C is obtained. In Π, the actual displacement of the contact surface coordinate system C with respect to the initial coordinate system L occurs. Then, in YT, conversion from the simultaneous conversion matrix $^{L}A_{CC}$ into position and roll, pitch and yaw angles is carried out. In a contact model, a force is generated in correspondence with the displacement after contact, and this is expressed in a non-linear form to mean that no force is generated before contact. An environment model θ denotes for example coefficients of elasticity and viscosity for when the polishing wheel 1 is a buff lace. Here, detected forces detected by torque sensors and the like are force sensor output $^{S}F$. By multiplying these force sensor outputs $^{S}F$ from the joint axes by a Jacobi transposed matrix $(J_{SC}^{T})$ it is possible to obtain detected values of force and moment $^{C}F$ in the contact surface coordinate system C. Here, when a sensor coordinate system S has been defined, $(J_{SC}^{T})$ means a Jacobi matrix transposition of the sensor coordinate system S to the contact surface coordinate system C. Also, the force sensor output $^{S}F$ multiplied by the Jacobi's transposed matrix $(J_{SJ}^{T})$ from the sensor coordinate system S to the axis coordinate system J is the disturbance $^{J}D$.

Figure 12:
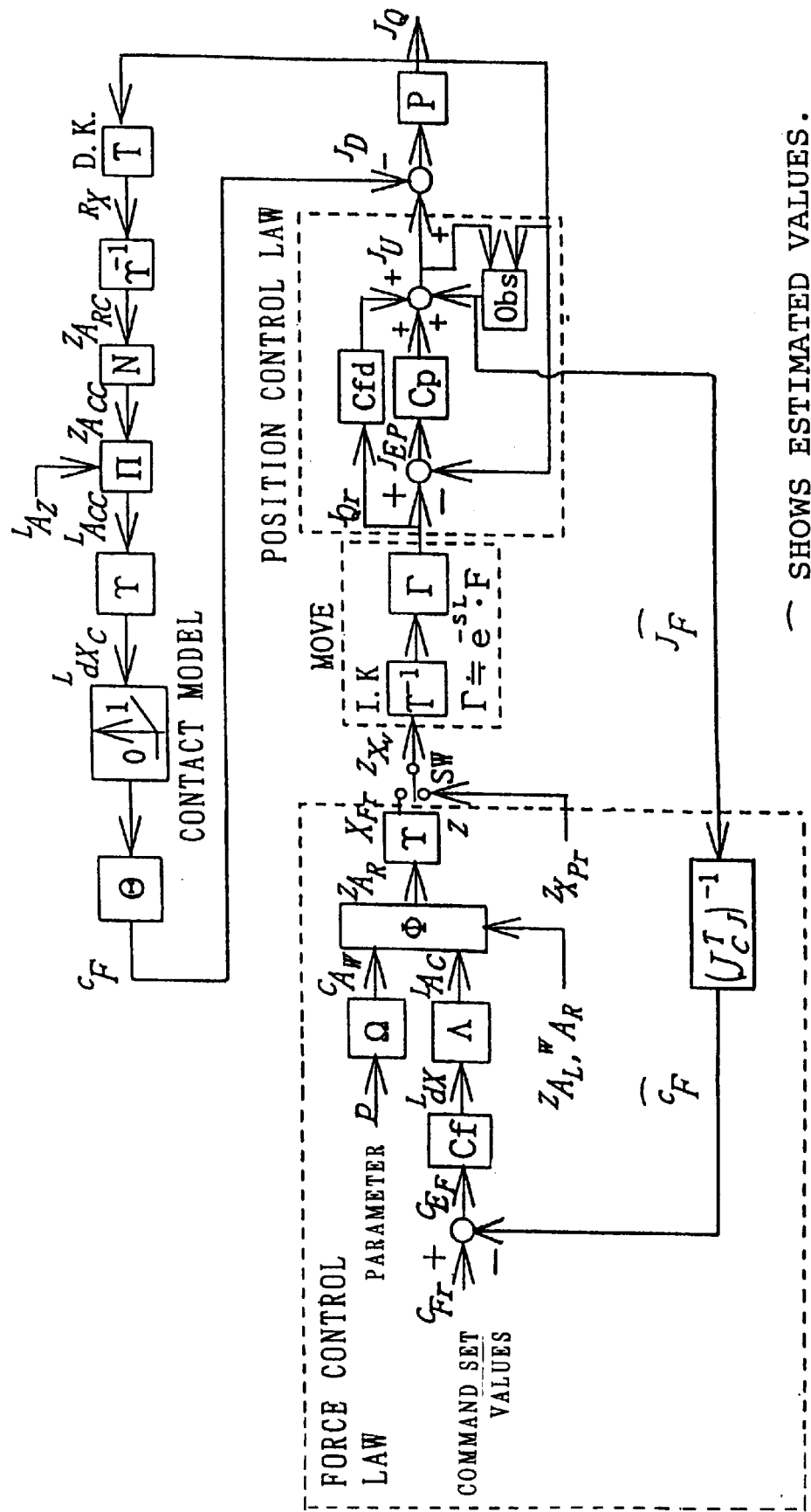
FIG. 12 is control block diagram of a watch outer case polishing apparatus wherein detected values of force and moment are estimated by an observer.

FIG. 12 shows a preferred embodiment wherein instead of detecting forces by means of expensive torque sensors or the like the above-mentioned observer is used. By using the observer $O_{bs}$ it is possible to obtain an estimated disturbance value and obtain estimated detected values of force and moment $^{C}F$ in the contact surface coordinate system C by multiplying this by the transposed inverse matrix $(J_{CJ}^{T})^{-1}$ of the Jacobi matrix from the contact surface coordinate system C to the joint axis coordinate system J. By using these estimated detected values of force and moment $^{C}F$ estimated by the observer in the force control law it is possible to perform this control cheaply.

Figure 13A:
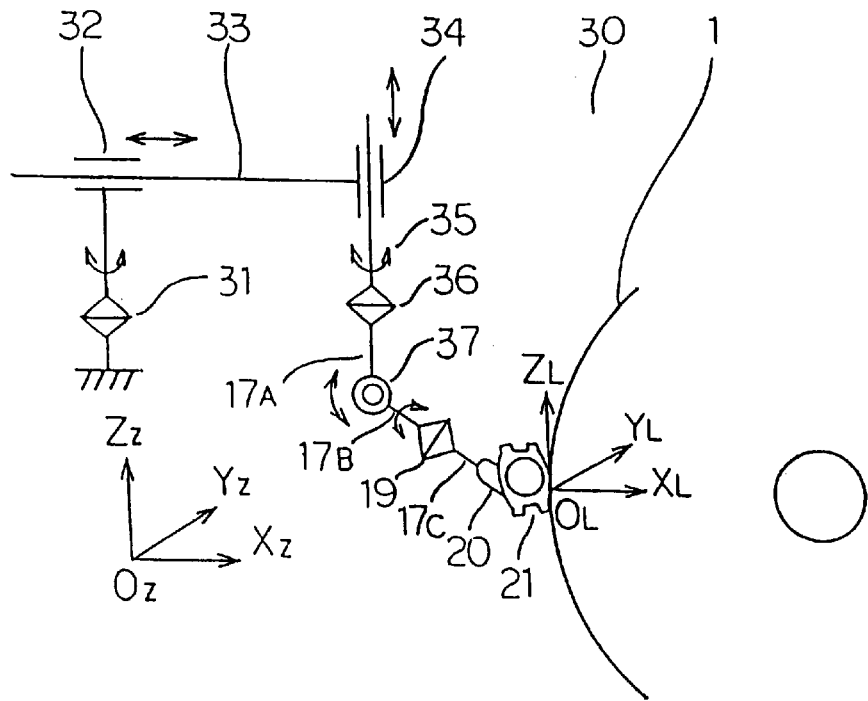
FIG. 13(A) is a view of the construction of a watch outer case polishing apparatus of a second preferred embodiment of the invention.
Figure 13B:
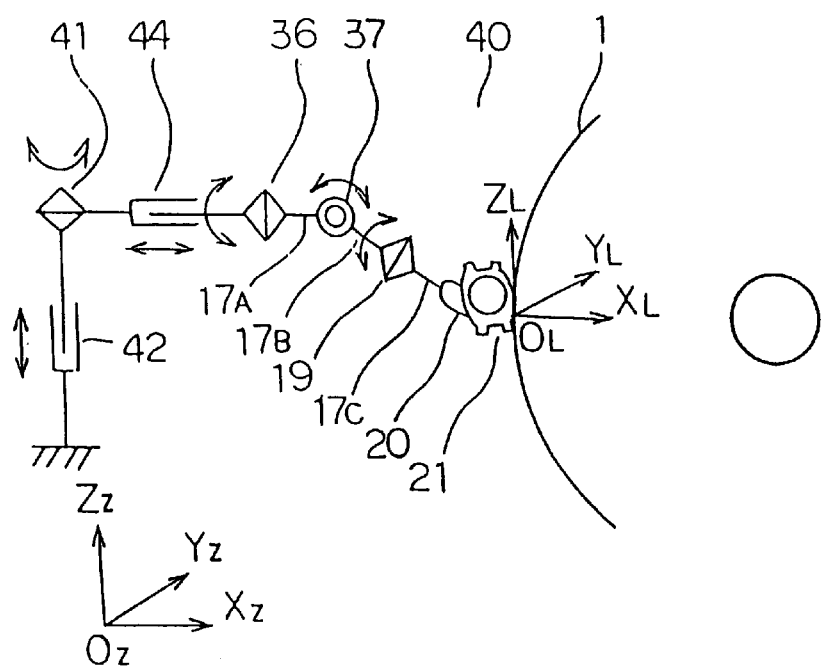
FIG. 13(B) is a view of the construction of a watch outer case polishing apparatus of a third preferred embodiment of the invention.

Next, a second preferred embodiment of the invention is shown in FIG. 13(A) and a third preferred embodiment of the invention is shown in FIG. 13(B). The third preferred embodiment is a modified version of the second preferred embodiment.

Parts the same as parts in the first preferred embodiment have been given the same reference numerals and an explanation thereof will be omitted.

In a manipulator 30 shown in FIG. 13(A), a plurality of polishing wheels 1 are arranged radially around a coordinates origin $O_{Z}$. A turning shaft 31 is turnable in a circumferential direction shown with an arrow in the drawing about a vertical line extending from $O_{Z}$ in the $Z_{Z}$ direction and is equivalent to turning means. A first joint 32 is mounted on the top of the turning shaft 31. A second translation joint 33 has one end supported by the first joint 32 and linearly drives a second joint 34 at the other end in a direction perpendicular to the vertical line $O_{Z} Z_{Z}$ and is equivalent to second translation joint means. A third translation joint 35 has one end supported by the second joint 34 and linearly drives a first rotation joint 36 at the other end in a direction parallel to the vertical line $O_{Z} Z_{Z}$. One end of a first link 17A is fixed to the first rotation joint 36, and one end of a second link 17B is fixed to the other end of the first link 17A by way of a second rotation joint 37.

In a manipulator 40 shown in FIG. 13(B), a first joint 42 linearly drives a turning shaft 41 at its upper end in the direction of a vertical line $O_Z\ Z_Z$. The turning shaft 41 is turnable in a circumferential direction shown with an arrow in the drawing about the vertical line $O_Z\ Z_Z$. One end of a second joint 44 is fixed to the turning shaft 41. The second joint 44 linearly drives a first rotation joint 36 at its other end.

However, as mentioned earlier, if convenience of calculation is not considered the construction need not be limited to the one described above.

The manipulators 30 and 40 carry out the same control as the manipulator 10 of the first preferred embodiment in a specified order with respect to the plurality of polishing wheels 1 arranged radially.

As a result, consecutive polishing operations with a plurality of polishing wheels 1 of different polishing grades is possible. Also, if a driving circuit (not shown) of a polishing wheel 1 breaks down or is being inspected, it is possible to change to another polishing wheel 1.

In the first through third preferred embodiments described above the work 21 was held, but it is also possible to use a similar mechanism to hold a polishing wheel 1 and carry out the same hybrid control.

Next, the construction of a mechanism suited to force and moment detection will be described.

Figure 14:
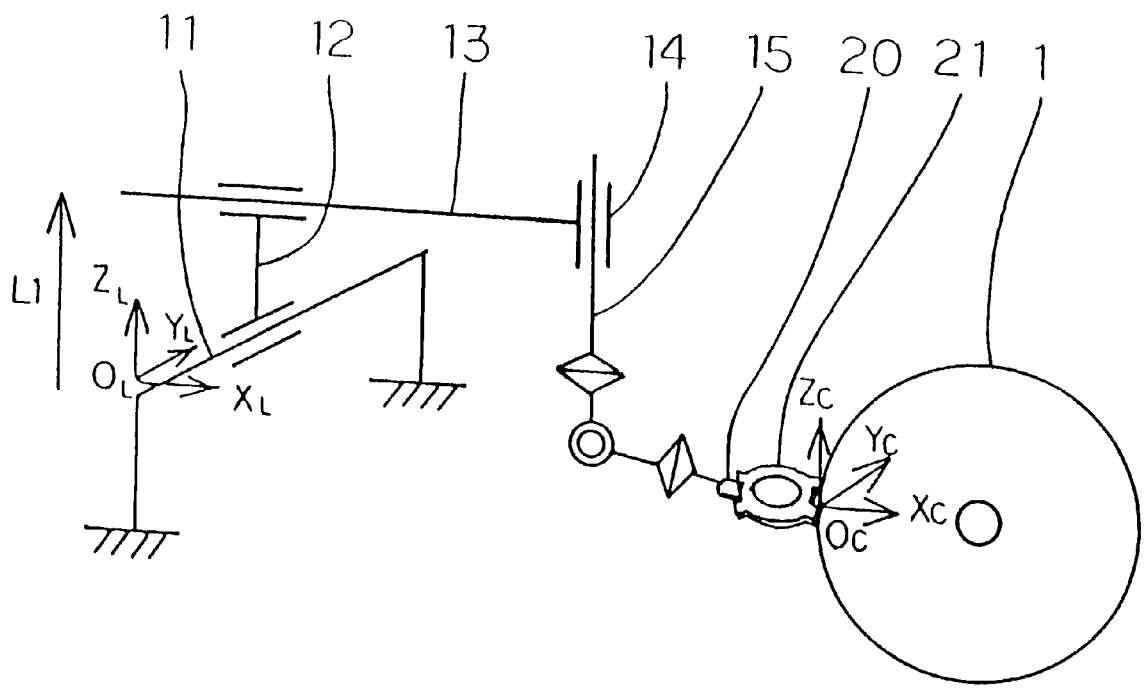
FIG. 14 is a construction view of a mechanism suited to force and moment detection.

Coordinate conversion systems are defined with respect to an example mechanism shown in FIG. 14, and forces and moments acting on the work 21 and equivalent values at joint axes are obtained. The force and moment in the contact surface coordinate system C are, from $^JF = J_{JC}^T \times {}^CF$, expressed $^CF = (J_{JC}^T)^{-1}\ {}^JF$. Focusing on this Jacobi matrix $J_{JC}^T$, the characteristics of the mechanism will now be considered. At this time it is assumed that the contact surface coordinate system C is only very slightly displaced from the initial coordinate system L and can be approximated to the initial coordinate system L.

Denavit-Hartenberg parameters for the mechanism shown in FIG. 14 are listed in Table 2.

TABLE 2

| i | $a_{i-1}$ | $\alpha_{i-1}$ | $d_i$ | $\theta_i$ |
|---|---|---|---|---|
| 1 | 0 | −90 | y | −90 |
| 2 | $L_i$ | −90 | x | 90 |
| 3 | 0 | 90 | $-L_i$ | 90 |
| 4 | 0 | 0 | 0 | $\theta_1$ |
| 5 | 0 | 90 | 0 | $\theta_2$ |
| 6 | 0 | −90 | $L_3$ | $\theta_3$ |

When a simultaneous conversion matrix is made on the basis of Table 2, the result is Exp. 16.

$$^{i-1}A_i = \begin{bmatrix} c\theta_i & -s\theta_i & 0 & a_{i-1} \\ s\theta_i c\alpha_{i-1} & c\theta_i c\alpha_{i-1} & -s\alpha_{i-1} & -s\alpha_{i-1}d_i \\ s\theta_i s\alpha_{i-1} & c\theta_i s\alpha_{i-1} & c\alpha_{i-1} & c\alpha_{i-1}d_i \\ 0 & 0 & 0 & 1 \end{bmatrix} \quad \text{(Exp. 16)}$$

where c and s stand for cos and sin. From this, simultaneous conversion matrices converting from the base coordinate system Z to the joints are made. Also, a simultaneous conversion matrix of the contact surface coordinate system C as seen from the base coordinate system Z is made with it being assumed that the base coordinate system Z and the contact surface coordinate system C have the same attitude. that is, the first translation joint 11, the second translation joint 13 and the third translation joint 15 are orthogonal to each other (which translation joint is made to correspond with which axis of the base coordinate system Z is free), and made parallel with corresponding coordinate axes of the initial coordinate system L. Results of obtaining the Jacobi transposed matrix $J_{JC}^T$ and calculating $^JF$ are shown in Exp. 17.

$$^JF = \begin{bmatrix} \tau_1 \\ \tau_2 \\ \tau_3 \\ \tau_4 \\ \tau_5 \\ \tau_6 \end{bmatrix} = \begin{bmatrix} {}^cf_y \\ {}^cf_x \\ {}^cf_z \\ -e_y{}^cf_x + e_x{}^cf_y + {}^cm_z \\ -e_zc\theta_2{}^cf_x - e_zs\theta_2{}^cf_y + (e_ys\theta_2 + e_xc\theta_2){}^cf_z + s\theta_2{}^cm_x - c\theta_2{}^cm_y \\ a_1{}^cf_x + a_2{}^cf_y + a_3{}^cf_z - c\theta_1s\theta_2{}^cm_x - s\theta_1s\theta_2{}^cm_y + c\theta_2{}^cm_z \end{bmatrix} \quad \text{(Exp. 17)}$$

$a_1 = -s\theta_1s\theta_2(z + L_3c\theta_2) - c\theta_2(y - L_3s\theta_1s\theta_2)$ $a_2 = c\theta_2(x - L_3c\theta_1s\theta_2) + c\theta_1s\theta_2(z - L_3c\theta_1)$ $a_3 = -c\theta_1s\theta_2(y - L_3s\theta_1s\theta_2) + s\theta_1s\theta_2(x - L_3c\theta_1s\theta_2)$ where $e_x$, $e_y$, $e_z$ are unit vectors. As a result, it can be seen that the forces or torques arising in the first through third axes correspond one to one with force components acting on the contact surface coordinate system C. That is, it can be seen that in whatever attitude force control is carried out, the force components in the contact surface coordinate system C can be detected by finding the outside forces acting on the first through third axes. This is the advantage of the base coordinate system Z and the contact surface coordinate system C being given the same attitude in the first and third preferred embodiments. In the turning shafts 31 and 41 of the second preferred embodiment and the third preferred embodiment torque is detected, and direction components of force parallel with the axes of the contact surface coordinate system C are calculated by dividing this torque by the radial direction distance.

Also, this time reversely it is calculated how much force or torque is acting on the contact surface coordinate system C when outside forces acting on the joint axes are estimated by means of an observer. The results of this calculation are shown in Exp. 18.

$$\begin{bmatrix} {}^c f_x \\ {}^c f_y \\ {}^c f_z \\ {}^c m_x \\ {}^c m_y \\ {}^c m_z \end{bmatrix} = (J_{JC}^T)^{-1} {}^J F = \begin{bmatrix} \tau_2 \\ \tau_1 \\ \tau_3 \\ d_1 \tau_1 + d_2 \tau_2 + d_3 \tau_3 + c^2 \theta_2 / b \tau_4 - s\theta_1 s\theta_2 / b\tau_5 - c\theta_2 / b\tau_6 \\ d_4 \tau_1 + d_5 \tau_2 + d_6 \tau_3 + s\theta_2 c\theta_2 / b\tau_4 - c\theta_1 s\theta_2 / b\tau_5 - s\theta_2 / b\tau_6 \\ e_x \tau_1 - e_y \tau_2 + \tau_4 \end{bmatrix}$$ (Exp. 18)

$d_1 = e_y c^2 \theta_2 / b - e_z c\theta_2 s\theta_1 s\theta_2 / b + a_1 c\theta_2 / b$ $d_3 = -e_x s\theta_2 c\theta_2 / b - e_z s\theta_2 c\theta_1 s\theta_2 / b + a_2 s\theta_2 / b$ $d_5 = (e_y s\theta_2 + e_x c\theta_2) c\theta_1 s\theta_2 / b + a_3 s\theta_2 / b$ Therefore, if the value of the outside forces $^J F$ on the joint axes is estimated by an observer, it is possible to estimate easily the pushing force and moment acting on the contact surface coordinate system C during polishing and the matching of the constructions of the mechanisms of the first to third preferred embodiments with the observer estimation mechanism becomes much better. Pushing forces and moments in the contact surface coordinate system estimated in this way can be easily used for force control. Furthermore, because for force no coordinates conversion is necessary the usefulness of this mechanism can be confirmed.

As described above, according to this invention, because a watch outer case polishing apparatus holds a watch outer case and polishes surfaces of the watch outer case by pressing it against a polishing wheel, viewed dynamically control is easy to carry out and automation using a manipulator with the object of high-variety, low-quantity production of watch outer cases is made possible.

Also, in this invention, because the translation joints are disposed in parallel with the axes of the base coordinate system and the base coordinate system and the initial coordinate system are made parallel, outside forces or moments acting on the joints and pressing forces and moments in the contact surface coordinate system can be combined with relatively simple Jacobi matrices. In particular, outside forces in specified joint axes and outside forces in the contact surface coordinate system are in a one to one relationship and disturbance calculation is easy.

Also, in this invention, because the apparatus is made turnable in a circumferential direction about a vertical line using turning means and the linear drive direction of the second translation joint means and the linear drive direction of the third translation joint means are made parallel with axes of the initial coordinate system, in addition to the effects of the first preferred embodiment, continuous polishing operation using a plurality of polishing wheels becomes possible.

Also, in this invention, because the position and attitude of the work and the force and moment acting between the work and the polishing wheel are arithmetically controlled in a functionally separated manner and simultaneously, it is possible to achieve equilibrium of manipulator control quickly and stable control can be carried out.

Furthermore, in this invention, because detected values of force and moment are estimated by an observer on the basis of observer theory, the apparatus is cheap compared to a case wherein torque sensors or the like are used.

What is claimed is:

1. A polishing apparatus comprising:
   a polishing member for polishing a workpiece, the polishing member and the workpiece defining therebetween a contact surface having a contact surface coordinate system relative to an initial coordinate system defined when the polishing member and the workpiece initially contact one another at the contact surface but before a force is exerted on the contact surface to polish the workpiece;
   a manipulator having at least one moving element having driving portions for manipulating the polishing member to polish the workpiece, the manipulator having a base disposed at a coordinate origin of a base coordinate system;
   first control means for successively updating a position and attitude of the contact surface coordinate system with respect to the initial coordinate system on the basis of a deviation between preselected values of force and moment acting on the polishing member and detected values of force and moment acting at the contact surface between the polishing member and the workpiece when a force is exerted on the contact surface to polish the workpiece;
   second control means for successively updating a position and attitude of the contact surface coordinate system with respect to a coordinate system corresponding to the polishing member by changing a position and attitude of the polishing member;
   calculating means for calculating a position and attitude of the manipulator on the basis of the updated results of the first and second control means and a position and attitude of the initial coordinate system with respect to the base coordinate system; and
   driving means for driving the driving portions of the moving element of the manipulator to manipulate the polishing element on the basis of the calculation results of the calculating means.

2. A polishing apparatus according to claim 1; wherein the moving element of the manipulator comprises a translation element for translationally moving the polishing element.

3. A polishing apparatus according to claim 1; wherein the moving element of the manipulator comprises a rotational element for rotating the polishing element.

4. A polishing apparatus according to claim 1; wherein the manipulator has a plurality of moving elements each having driving portions for manipulating the polishing member to polish the workpiece.

5. A polishing apparatus according to claim 4; wherein the moving elements comprise translation and rotational elements for translationally moving and rotating, respectively, the polishing element.

6. A polishing apparatus according to claim 1; wherein the polishing element is generally disc-shaped.

7. A polishing apparatus comprising:
   a polishing member for polishing a workpiece, the polishing member and the workpiece defining therebetween a contact surface having a contact surface coordinate system relative to an initial coordinate system defined when the polishing member and the workpiece initially contact one another at the contact surface but before a force is exerted on the contact surface to polish the workpiece;

a manipulator having at least one moving element having driving portions for manipulating the workpiece to polish the workpiece, the manipulator having a base disposed at a coordinate origin of a base coordinate system;

first control means for successively updating a position and attitude of the contact surface coordinate system with respect to the initial coordinate system on the basis of a deviation between preselected values of force and moment acting on the workpiece and detected values of force and moment acting at the contact surface between the polishing member and the workpiece when a force is exerted on the contact surface to polish the workpiece;

second control means for successively updating a position and attitude of the contact surface coordinate system with respect to a coordinate system corresponding to the workpiece by changing a position and attitude of the workpiece;

calculating means for calculating a position and attitude of the manipulator on the basis of the updated results of the first and second control means and a position and attitude of the initial coordinate system with respect to the base coordinate system; and driving means for driving the driving portions of the moving element of the manipulator to manipulate the workpiece on the basis of the calculation results of the calculating means.

8. A polishing apparatus according to claim 7; wherein the moving element of the manipulator comprises a translation element for translationally moving the workpiece.

9. A polishing apparatus according to claim 7; wherein the moving element of the manipulator comprises a rotational element for rotating the workpiece.

10. A polishing apparatus according to claim 7; wherein the manipulator has a plurality of moving elements each having driving portions for manipulating the workpiece to polish the workpiece.

11. A polishing apparatus according to claim 10; wherein the moving elements comprise translation and rotational elements for translationally moving and rotating, respectively, the workpiece.

12. A method of polishing a workpiece, comprising the steps of:

providing a polishing member for polishing a workpiece, the polishing member and the workpiece defining therebetween a contact surface having a contact surface coordinate system relative to an initial coordinate system defined when the polishing member and the workpiece initially contact one another at the contact surface but before a force is exerted on the contact surface to polish the workpiece;

providing a manipulator having driving portions for manipulating the polishing member or the workpiece, the manipulator having a base disposed at a coordinate origin of a base coordinate system;

driving the driving portions of the manipulator to polish the workpiece;

successively updating a position and attitude of the contact surface coordinate system with respect to the initial coordinate system on the basis of a deviation between preselected values of force and moment acting on the polishing member or the workpiece and detected values of force and moment acting at the contact surface between the polishing member and the workpiece when a force is exerted on the contact surface during polishing of the workpiece;

successively updating a position and attitude of the contact surface coordinate system with respect to a coordinate system corresponding to the polishing member or the workpiece by changing a position and attitude of the polishing member or the workpiece, respectively;

calculating a position and attitude of the manipulator on the basis of the updated results of the first and second control means and a position and attitude of the initial coordinate system with respect to the base coordinate system; and driving the driving portions of the manipulator to manipulate the polishing element or the workpiece to polish the workpiece on the basis of the calculation results of the calculating means.

\* \* \* \* \*